United States Patent [19]

Inoue

[11] Patent Number: 4,480,490
[45] Date of Patent: Nov. 6, 1984

[54] MECHANICAL MEMBER

[75] Inventor: Kiyoshi Inoue, Tokyo, Japan

[73] Assignee: Inoue-Japax Research Incorporated, Yokohama, Japan

[21] Appl. No.: 435,490

[22] Filed: Oct. 20, 1982

[30] Foreign Application Priority Data

| Oct. 22, 1981 | [JP] | Japan | 56-157449[U] |
| Oct. 22, 1981 | [JP] | Japan | 56-157448[U] |
| Nov. 17, 1981 | [JP] | Japan | 56-171150[U] |
| Nov. 30, 1981 | [JP] | Japan | 56-177958[U] |
| Dec. 18, 1981 | [JP] | Japan | 56-189097[U] |
| Dec. 26, 1981 | [JP] | Japan | 56-210958 |

[51] Int. Cl.$^3$ ............... F16D 11/06; F16D 51/00
[52] U.S. Cl. .................... 74/401; 192/89 B; 277/236; 403/368
[58] Field of Search ............ 277/236; 74/401; 192/89 B; 403/368, 370, 372

[56] References Cited

U.S. PATENT DOCUMENTS

| 2,706,491 | 4/1955 | Kohler | 192/89 B |
| 2,707,108 | 4/1955 | Schottler . | |
| 2,798,748 | 7/1957 | Maurer | 403/372 |
| 2,905,006 | 9/1959 | Wagner | 74/401 |
| 3,107,766 | 10/1963 | Pritchard | 192/89 B |
| 3,640,363 | 2/1972 | Spalding | 192/89 B |
| 3,646,777 | 3/1972 | Anderson . | |
| 3,905,209 | 9/1975 | Conrad . | |
| 4,206,617 | 6/1980 | Nakamoto . | |

FOREIGN PATENT DOCUMENTS

| 1008537 | 10/1943 | Fed. Rep. of Germany . |
| 2239917 | 8/1972 | Fed. Rep. of Germany . |
| 2811754 | 3/1978 | Fed. Rep. of Germany . |
| 834075 | 5/1960 | United Kingdom . |

Primary Examiner—Robert I. Smith
Attorney, Agent, or Firm—Karl F. Ross; Herbert Dubno

[57] ABSTRACT

A mechanical member employs an inclined ring body having a frustoconical profile and comprising a multiplicity of tough and elastic, inclined ring elements each individually having a frustoconical profile and formed with a centrally located opening for slidably accepting therethrough a first member which is cylindrical and an outer peripheral edge adapted for engagement with a second member. The ring element has a plurality of outer slits extending radially inwardly from the outer peripheral edge towards the centrally located opening and a plurality of inner slits extending radially outwardly from the edge defining the centrally located opening towards the outer peripheral edge. An inclination adjusting member is carried by one of the first and second members so as to maintain a bearing contact with the inclined ring body and adapted to be displaced on the one member to change a given angle of the frustocone, thereby regulating the state of engagement of the ring body with the first and second members.

10 Claims, 17 Drawing Figures

MECHANICAL MEMBER

FIELD OF THE INVENTION

The present invention relates to a mechanical member in the form of a ring body and is applicable to a rotary seal, bearing, gear, brake, clutch and various other mechanical devices where mechanical coupling between two parts is important.

BACKGROUND OF THE INVENTION

A variety of mechanical devices are widely in use to mechanically couple two parts together or to bring one part into engagement with the other. These devices are used to transmit a given motion from one part to the other, to transform one motion to another, to hold the separate motions or to control a given motion. These devices quite often require that the state of engagement of parts is strictly regulated. For most devices, however, the regulation has hitherto had to be made only at the stage of assembling the parts. Once the parts are assembled to form a mechanical device, the re-adjustment of the state of engagement is generally not possible so that its utility is largely limited.

OBJECTS OF THE INVENTION

It is an object of the present invention to provide a novel and useful mechanical member which is applicable to a variety of mechanical devices and allows adjustment of the state of engagements between parts with ease in the stage of their utilization. It is also an object to provide a mechanical member of the type described which allows highly precise adjustment even after the parts have been assembled and in accordance with the nature and the use of a product in which the parts are incorporated.

SUMMARY OF THE INVENTION

In accordance with the present invention there is provided a mechanical member which comprises: an inclined ring body having a substantially frustoconical profile and being substantially uniform in thickness in a direction parallel to the axis of the frustocone, the ring body comprising at least one tough, self-supporting and elastic inclined ring element having such a profile and uniformity in thickness, and formed with a centrally located opening for slidably accepting therethrough a first member which is substantially cylindrical and an outer peripheral edge adapted for engagement with a second member, the ring element having a plurality of outer slits extending radially inwardly from said outer peripheral edge towards the centrally located opening and a plurality of inner slits extending radially outwardly from the edge defining the centrally located opening so that in use means carried by one of the first and second members may be in bearing contact with the ring body and the latter can be displaced on the one member to change a given angle of the frustocone, thereby regulating the state of engagement of the ring body between the first and second members.

The ring body can be composed of a metal or alloy such as stainless steel, copper or brass and should be tough and elastic. Where the ring body is prepared from a plurality of ring elements, each ring element should be thin having a thickness not greater than, say, 1 mm. The ring elements can be prepared by punching a metal sheet and inclining the punched elements.

BRIEF DESCRIPTION OF THE DRAWING

These and other features of the present invention as well as advantages thereof will become more readily apparent from a reading of the following description of certain embodiments, which are given by way of example only, reference being made to the accompanying drawing in which:

FIG. 11B being a section along the line XIB—XIB of FIG. 11A;

SPECIFIC DESCRIPTION

Figure 1:
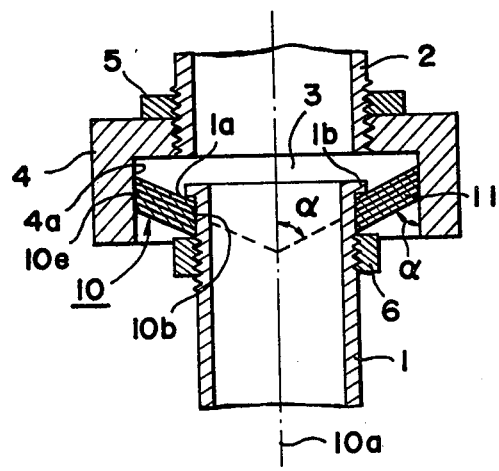
FIG. 1 is a longitudinal sectional view diagrammatically illustrating a rotary seal assembly incorporating the principles of the present invention.

Referring first to FIG. 1, there is shown a mechanical member 10 as applied to a rotary seal for mechanically coupling, in a fluid-tight relationship, two cylindrical tubular members 1 and 2 together through which a fluid passes and one of which is rotational and the other of which may be either rotational or stationary. The two cylindrical members 1 and 2 extend coaxially in their longitudinal direction and are spaced apart with a spacing 3. The lower tubular member 1 is shown to be of a smaller cross section and the upper tubular member 2 to be of a larger cross section. An intermediate cup-shaped member 4 accommodating the spacing 3 therein is threaded onto the upper tubular member 2 with a locking ring 5 also threaded thereonto to secure the member 4 in position. In accordance with the principles of the present invention, the seal member 10 in the example shown is used to mechanically couple the lower tubular member 1 of smaller cross-section with the cup-shaped member 4 secured to the upper tubular member 2 of larger cross-section.

The seal member 10 comprises an inclined ring body in the form of a frustocone in profile and uniform in thickness in a direction parallel to the axis 10a of the frustocone which is coaxial with the two tubular members 1 and 2 and the cup-shaped member 4. The ring body 10 may be a single unitary element which is sufficiently tough and elastically deformable, e.g. of a metal or alloy, but, as shown, preferably comprises a plurality of thin, convex (or concave) ring elements 11 each individually in the form of a frustocone in profile and again uniform in thickness. Thus, the ring body 10 shown is made up by stacking the ring elements 11 in intimate contact with one another as shown. The ring body 10 has a centrally located opening 10b whose edge is in bearing contact with the outer cylindrical surface of the first tubular member 1. The ring body 10 has an outer peripheral edge in bearing contact with the inner cylindrical surface of the cup-shaped member 4.

Figure 2A:
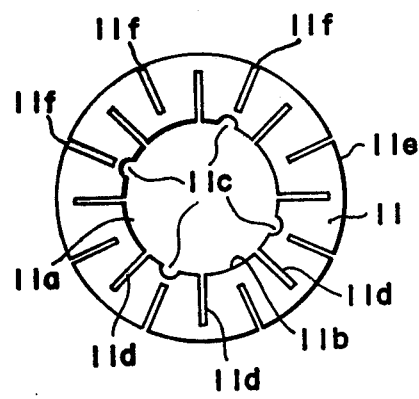
FIG. 2A is a plan view of a ring element used in a ring body stack according to the invention.
Figure 2B:
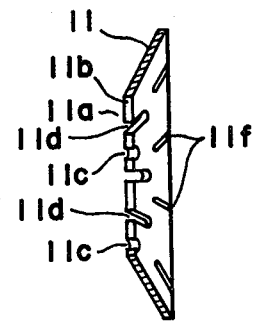
FIG. 2B is a sectional view of the ring element shown in FIG. 2A.

As shown in FIGS. 2A and 2B, each of the ring elements 11 has a centrally located, substantially circular opening 11a whose edge 11b is shown as including four recesses 11c which constitute key recesses for mating engagement with key projections which are formed on the outer cylindrical surface of the first tubular member 1 but not shown. In accordance with an important feature of the present invention, each ring element 11 is formed with a plurality of inner slits 11d equidistantly spaced apart and extending radially outwardly from the inner edge 11b towards the outer peripheral edge 11e as well as a plurality of outer slits 11f equi-distantly spaced apart and extending radially inwardly towards the inner edge 11b from the outer peripheral edge 11e of the ring element 11. Inner slits 11d and outer slits 11f are formed so as to alternate around the ring. The ring elements 11 are stacked so that any inner slit 11d or outer slit 11f in one element locates below any inner slit 11d or outer slit 11f in another element adjacent thereto. Each ring element 11 is made of a thin (e.g. less than 1 mm), tough, elastic metal or alloy and may be of stainless steel, copper or brass. Each ring element 11 is of frustoconical profile and hence the ring body 10 constituted with such elements 11 is shown in FIG. 1 as having a conical half angle α or is inclined with the angle α to the outer surface 1a of the tubular member 1 and the inner surface 4a of the cup-shaped member 4. The lower tubular member 1 is formed with an upper flange 1b to prevent the ring body 10 from coming off the tubular member 1.

Shown in abutting contact with a lower end portion of the inclined ring body 10 is a circular adjustment ring 6 rotationally threaded onto the outer cylindrical surface of the lower tubular member 1. By rotating the ring member 6 to displace it upwards, the ring body 10 squeezed between it and the flange 1b is elastically deformed, by virtue of the alternate outer and inner slits 11d and 11f formed therein, so as to tend to flatten the frustocone and increase the angle α. This results in an increase in the contact pressure of the ring body 10 in bearing contact with the inner surface 4a of the cup-shaped member 4 and with the outer surface 1a of the lower tubular member 1. The contact pressure and hence the coupling strength between the surfaces 1a and 4a is thus adjustable at will by adjustment of the position of the ring member 6 on the tubular member 1.

Figure 3:
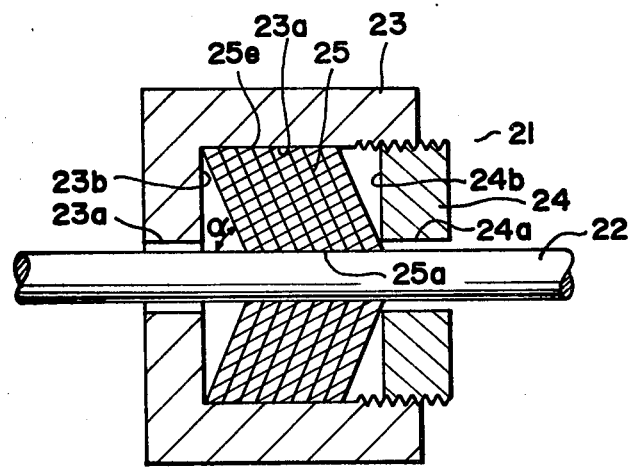
FIG. 3 is a longitudinal sectional view diagrammatically illustrating a bearing assembly embodying the principles of the present invention.
Figures 4A, 4B:
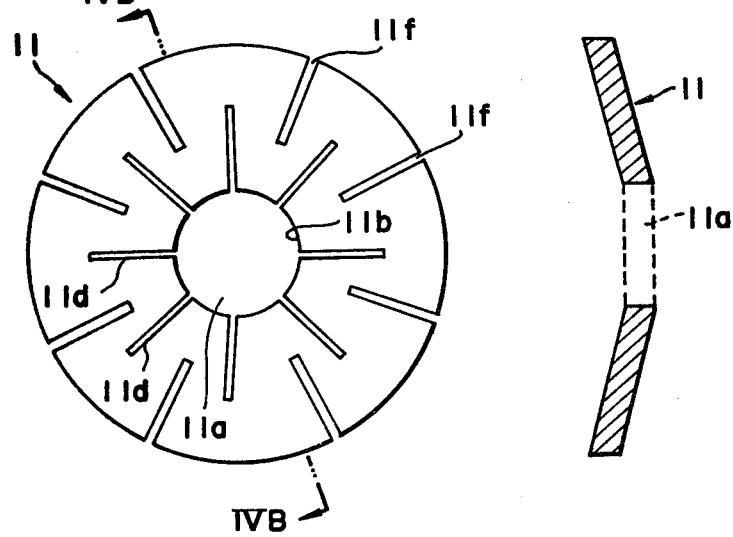
FIGS. 4A and 4B are plan and sectional views, respectively, of the ring element which may be used to assemble the ring body used in the embodiment of FIG. 3, FIG. 4B being a section along line IVB—IVB of FIG. 4A.

In FIG. 3 there is shown a mechanical member as applied to a bearing assembly 21 for rotatably supporting a cylindrical rod 22. The assembly 22 includes a cup-shaped casing 23 having a circular central opening 23a and an annular disk 24 rotatably threaded into the cup-shaped casing 23. The rod 22 passes through the opening 23a of the casing 23 and the central opening 24a of the disk 24. The assembly 21 is completed with a bearing member 25 constituted by a ring body 10 comprising a plurality of convex (concave) ring elements 11 as has been described. Such a ring body is shown in FIGS. 4A and 4B. The bearing member 25 comprising the ring body 10 has the centrally located opening 25a through which the rod 22 is slidably received and the cylindrical outer peripheral edge 25e which is accepted within and in bearing contact with the cylindrical inner surface 23a of, the casing 23. By rotating the annular disk 24 to displace it to the left as shown in FIG. 3, the inclined ring body 25 between the surface 23b of the casing 23 and the surface 24b of the annular disk 24 tends to flatten the frustocone and to increase the conical angle α. The position of the annular disk 24 threaded into the cup-shaped casing 23 is adjusted to adjust the conical angle α, thereby regulating the bearing contact pressure between the cylindrical rod 22 and the bearing element 25 and between the latter and the cylindrical inner surface 25e of the casing 25.

Figure 5:
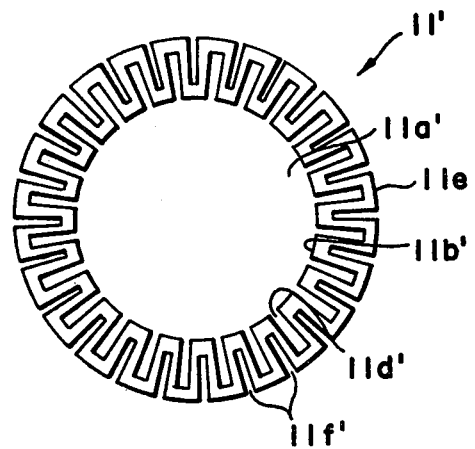
FIG. 5 is a plan view of another form of the ring element which may be used to embody the present invention.

FIG. 5 shows another embodiment of a ring element 11', which may be stacked to form a ring body 10 according to the present invention. It is seen that this ring element 11' is formed with a relatively large, circular central opening 11a' to provide the corresponding opening (10b) of the inclined ring body (10).

Figure 6:
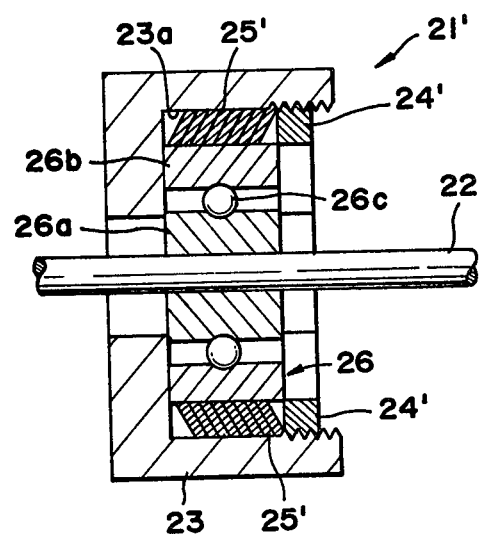
FIGS. 6 and 7 are axial sectional views diagrammatically illustrating different embodiments of the bearing assembly according to the present invention.

FIG. 6 shows another embodiment of the bearing assembly 21' made by incorporating a ring body 10 according to the present invention. The cylindrical rod 22 and the cup-shaped casing 23 used in this embodiment may be identical to those used in the embodiment of FIG. 3. In the embodiment of FIG. 6, however, the cylindrical rod 22 is rotationally supported by a conventional bearing assembly 26 and a bearing element 25' according to the invention is disposed between the conventional bearing assembly 26 and the cylindrical inner wall 23a of the cup-shaped member 23. The bearing element 25' is a ring body formed from ring elements which has an outer radius equal to that of ring elements 11 (FIG. 4) used in the embodiment of FIG. 3 and an inner radius greater than that of the ring element 11 and which may be of the type shown in FIG. 5. The conventional bearing assembly 26 comprises an inner ring 26a carried on the rod 22 by being angularly fixed thereon, an outer ring 26b coaxial with the rod 22 and spaced from the inner ring 26a and a plurality of ball bearings 26c interposed between the inner and outer rings 26a and 26b. In the embodiment of FIG. 6, it is between the outer ring 26b and the cylindrical inner surface 23a of the cup-shaped member 23 that the inclined ring body constituting the bearing element 25' according to the invention is disposed. The inclination or the conical angle of the ring body 25' is adjusted by adjusting the position of an annular disk 24' as in the embodiment of FIG. 3.

Figure 7:
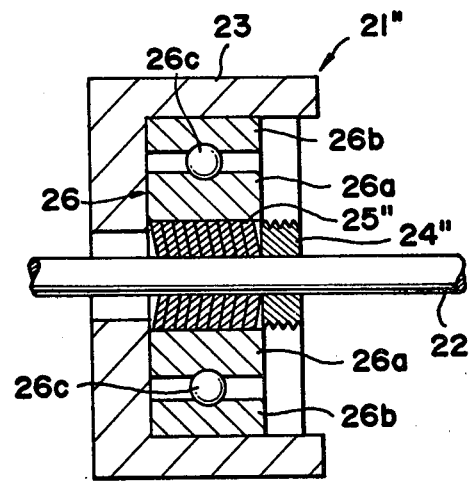

In a modification of FIG. 7, the outer ring 26b shown in the conventional bearing assembly 26 is secured to the cup-shaped casing 23 and the bearing element 25" according to the invention is interposed between the inner ring 26a of the assembly 26 and the cylindrical rod 22.

Figure 8:
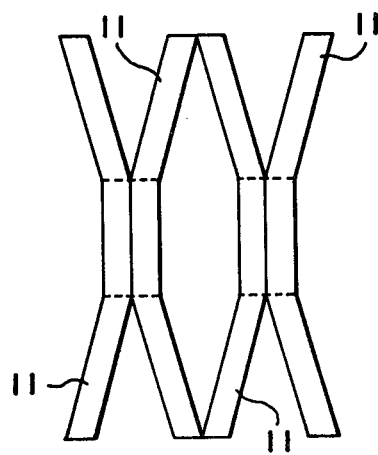
FIG. 8 is an elevational view diagrammatically illustrating a modified form of assembling ring elements to produce a ring body according to the invention.

FIG. 8 shows a modified form of stacking ring elements 11 to form a modified ring body 10'.

Figure 9:
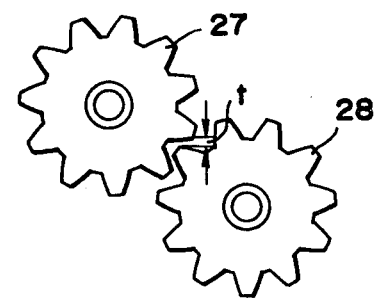
FIG. 9 is a plan view illustrating a pair of gears in a mesh with each other.

A mechanical member according to the invention can also be applied to one of two gears 27 and 28 in mesh with each other as shown in FIG. 9. In general, for such a pair of gears 27 and 28 to be in optimum engagement with each other, an optimum amount of backlash t is required. It is extremely advantageous and convenient if a gear assembly is provided in which the backlash can be regulated at will.

Figure 10:
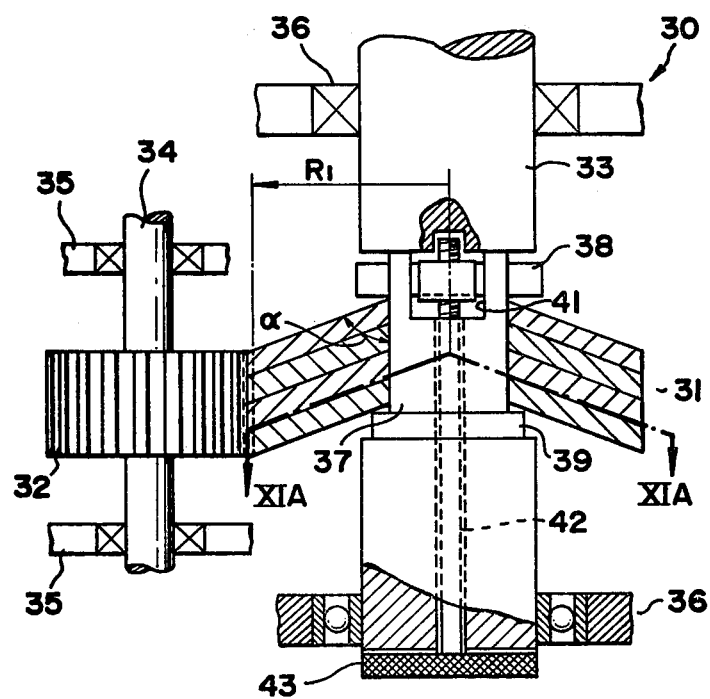
FIG. 10 is a longitudinal view, partly in section and partly diagrammatic, illustrating a gear assembly embodying the principles of the present invention.

In FIG. 10 there is shown such a gear assembly 30 which is realized in accordance with the principles of the present invention. The assembly 30 comprises a first gear 31 constituted by a mechanical member according to the invention and a second gear 32 which can be meshed with the first gear 31 with a variable backlash t. The first gear 31 is securely carried on a rotary shaft 33 rotationally driven by a motor (not shown). The second gear 32 is securely carried on an output shaft 34 whose rotation is used for any of various purposes desired. The output shaft 34 is shown as being journaled between bearings 35 while the input shaft 33 is journaled between bearings 36.

Figure 11A:
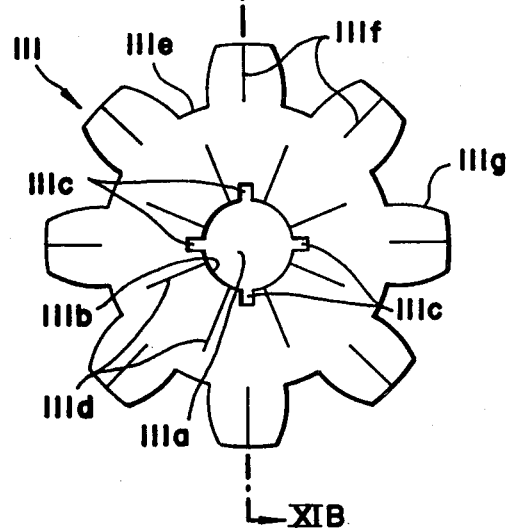
FIGS. 11A and 11B are plan and sectional views, respectively, diagrammatically illustrating a gear element which may be assembled to form a novel gear according to the present invention.
Figure 11B:
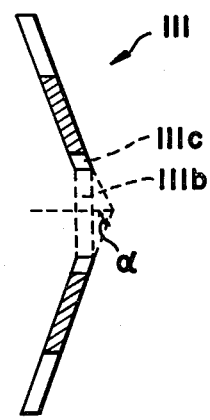

The first gear 31 comprises a plurality of gear elements piled immediately one upon another. Embodiments of each of such gear elements are shown and designated at 111 in FIGS. 11A and 11B. The gear element 111 shown has a centrally located opening 111a defined by an inner edge 111b and is also formed along its outer periphery with a plurality of teeth 111g. As in the embodiment of FIG. 2, the inner edge 111b is formed with four equi-distantly spaced grooves 111c designed to accept the corresponding projections (not shown) formed longitudinally on a portion 37 of the cylindrical surface of the input rotary shaft 33 (FIG. 10) which portion is of a smaller diameter than elsewhere on the latter as shown. Thus, the first gear 31 is angularly secured on the input rotary shaft 33 by being keyed with such projections on the indented portion 37 on the cylindrical surface of the input rotary shaft 33. Of course, the portion 37 is coaxial with the first gear 31 and also with the axis of rotation of the input rotary shaft 33 as can be seen from FIG. 10. Referring back to FIG. 11A, the gear element 111 is further formed with a plurality of inner slits 111d extending radially outwardly from the inner edge 111b towards the outer peripheral edge 111e as well as a plurality of outer slits radially extending inwardly from the teeth 111g towards the inner edge 111b. Such gear elements 111 are piled intimately one upon another so that any tooth on one gear element lies upon any tooth on another gear element adjacent thereto. As in the previous embodiments, when the inclined element 111 is elastically deformed so as to become flatter or to increase the conical angle (FIG. 11B), its inner diameter is reduced while its outer distance between two diametrically positioned teeth 111g is increased.

Figure 12:
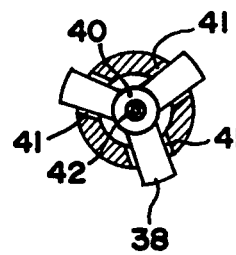
FIG. 12 is a cross sectional view of a portion of the arrangement of FIG. 10.
Figure 13:
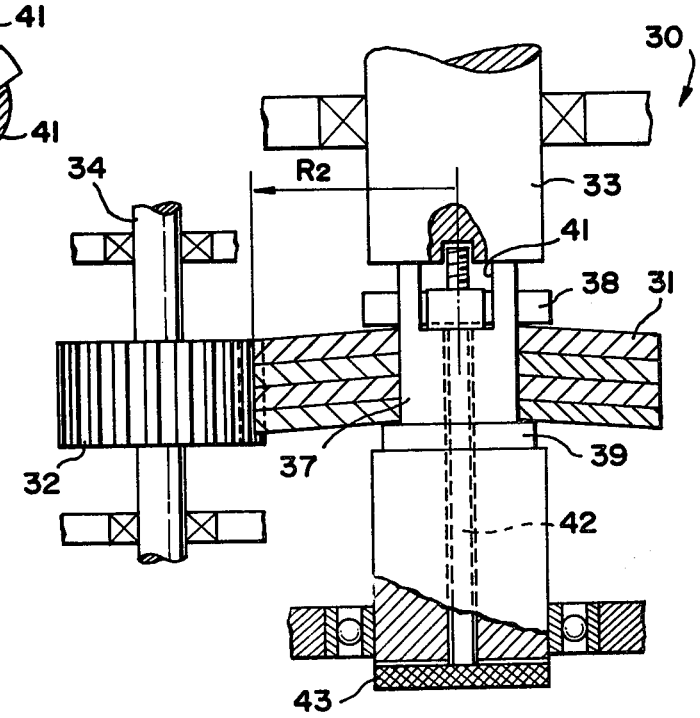
FIG. 13 is an elevational view, broken away, of the gear assembly of FIG. 10 in which the gear is adjusted.

Referring back to FIG. 10, the first gear 31 assembled from such gear elements 111 is limited in a distance defined between blade elements 38 and an annular shoulder 39 of the input rotary shaft 33. As can also be seen from FIG. 12, three such blades 38 project radially outwardly from a nut 40 through three windows 41, respectively. The nut 40 is threaded onto a lead screw 42 extending longitudinally of the input rotary shaft 33 within a hollow space 43 therein (FIG. 13). The lead screw 42 terminates at and is secured to a thumb wheel 43 with a knurled periphery for ease of its rotation. The thumb wheel 43 is rotated to rotate the lead screw 42 in one direction to move the nut 40 and the blades 38 downwards and in the other direction to move the nut 40 and the blades 38 upwards. Since the first gear 31 is slidably displaceable translationally in a limited space between the blade elements 38 and the annular shoulder 39, the downward movement of the nut 40 and the blades 38 causes the elastic first gear 31 to rise or become flatter while increasing the conical angle α by virtue of the fact that the slits 111d and 111f mentioned are formed in each gear element 111.

FIG. 10 shows a state in which no downward pressure is applied to the first gear 31 by the blades 38. It is shown that the teeth 111g are spaced by a distance R1 from the center axis of the first gear 31. In this state, the first gear 31 is assumed to be only incompletely meshed with the second gear 32 with a large amount of backlash t. When the nut 40 is moved downward by rotation of the thumb wheel 43, the consequential downward movement of the blades 38 causes the first gear 31 to become flatter, thereby increasing the distance from R1 to R2 as shown in FIG. 13 to reduce the backlash t. It will be seen that the backlash t is reduced to an optimum amount by adjusting the angle of rotation of the thumb wheel 43 or the lead screw 42 and the consequential downward displacement of the blade elements 38.

Figure 14:
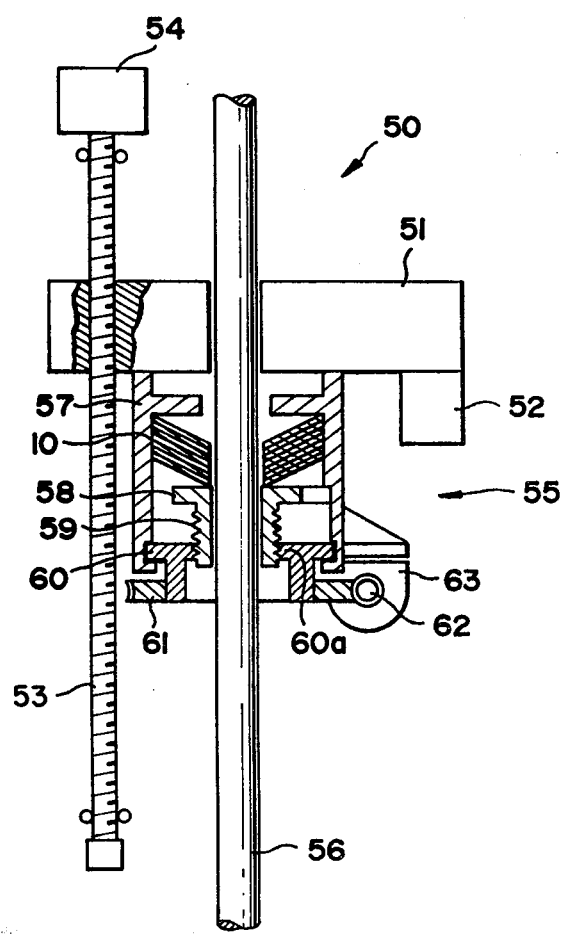
FIG. 14 is a longitudinal sectional view diagrammatically illustrating a brake assembly according to the present invention.

The present invention is also applicable to a braking device. In FIG. 14, there is shown a portion of a machine tool 50 including a machining head 51 from which a tool holder 52 depends. The machining head 51 is threadedly carried on a vertically extending lead screw 53 driven by a motor 54 to displace the tool holder 52 up and down. A braking device 55 for braking the vertical movement of the holder 52 includes a cylindrical rod 56 passing slidably through the machining head 51 and extending in parallel with the lead screw 53. The cylindrical rod 56 is fixed in position. Coaxially with the cylindrical rod 56, a cylindrical casing 57 is provided and depends securely from the machining head 51. The casing 57 is shown accommodating therein an inclined ring body 10 comprising a plurality of ring elements as previously described. The ring body 10 is shown accepting the cylindrical rod 56 therethrough. Shown in abutting contact with the lower end of the inclined ring body 10 is a disk 58 having a threaded downward extension 59 in mesh with a threaded inner edge 60a of an annular rotary drive 60. The ring body 10, the disk 58 and the rotary drive 60 are arranged to be coaxial with the cylindrical rod 56. The rotary drive 60 is drivingly coupled via a worm gear 61 to a worm 62 secured to the output shaft of a motor 63. When it is desired to halt the vertical (up to down) movement of the machining head 51, the motor 63 is driven to rotate the rotary drive 60. This causes the disk 58 to move upward so that the inclined ring body 10 under the consequential upward pressure becomes flatter. This in turn causes an increase in contact pressure between the cylindrical rod 56 and the ring body 10 and between the latter and the cylindrical inner surface of the casing 57. Thus, the machining head 51 becomes secured to the cylindrical rod 56 fixed in position.

It should be understood that the principles of the present invention are applicable to various other mechanical devices including clutches. It should also be noted that the invention is applicable to the design of a motor. Thus, either rotor or stator or both of a motor can be constituted by a ring body so that the gap spacing therebetween is regulated by adjustment of the inclination of the inclined ring body.

What is claimed is:

1. A mechanical member comprising:

an inclined ring body having a substantially frustoconical profile and being substantially uniform in thickness in a direction parallel to the axis of the frustocone, said ring body comprising a stack of self-supporting and elastic, inclined ring elements having such a profile and uniformity in thickness, and each formed with a centrally located opening for slidably accepting therethrough a first member which is substantially cylindrical and an outer peripheral edge adapted for engagement with a second member, said ring elements each having a plurality of outer slits extending radially inwardly from said outer peripheral edge towards said centrally located opening and a plurality of inner slits extending radially outwardly from the edge defining said centrally located opening;

means for angularly orienting the elements of each stack with respect to one another, said means for angularly orienting said elements including an elongated formation on one of said members and formations on a corresponding edge of each of said elements engaging said elongated formation; and means carried by one of said first and second members so as to hold a bearing contact with said ring body and adapted to be displaced on said one member to change a given angle of said frustocone, thereby regulating the state of engagement of said ring body with said first and second members.

2. The mechanical member defined in claim 1 wherein said ring body comprises a plurality of such inclined ring elements which are equal in thickness and shaped and composed of an elastic, tough metal or alloy.

3. The mechanical member defined in claim 2 wherein said ring elements have a thickness not greater than 1 mm.

4. The mechanical member defined in claim 2 wherein said ring elements are assembled to form said ring body by piling the ring elements intimately one upon another.

5. The mechanical member defined in claim 4 wherein said ring elements are piled so that each outer slit on one element lies upon an outer slit on another element adjacent thereto and each inner slit on said one element lies upon an inner slit on said another element.

6. In a mechanical connector between a first element having an axis and a second element radially spaced from said first element, the improvement wherein said connector comprises a stack of frustoconical members in intimate contact with one another and provided with an inner periphery closely surrounding said first element and an outer periphery engaging said second element, each of said members being provided with inwardly extending slits running from its outer periphery alternating with outwardly extending slits running from its inner periphery;

means bearing on said stack for adjustably flattening same to regulate the ability of said stack to bridge the spacing between said elements; and means for angularly orienting the members of said stack with respect to one another on said first element, said means for angularly orienting said members including an elongated formation on one of said elements and complementary formations on a corresponding edge of each of said members engaging sid elongated formation.

7. The improvement defined in claim 6 wherein said elongated formation and said complementary formations are notches provided in said members.

8. The improvement defined in claim 7 wherein said notches are provided along said inner periphery.

9. The improvement defined in claim 8 wherein said first element is a tubular member provided at its end with a shoulder and said means bearing on said stack for flattening same includes a nut threaded on said first element, said second element including a sleeve surrounding said stack and formed on another tubular member axially aligned with said first element, the outer periphery of said stack bearing upon an inner surface of said sleeve.

10. The improvement defined in claim 8 wherein said stack forms a gear of an effective radius controlled by the degree of flattening of said stack and said second element is another gear meshing with the first mentioned gear.

* * * * *